Figure 4:
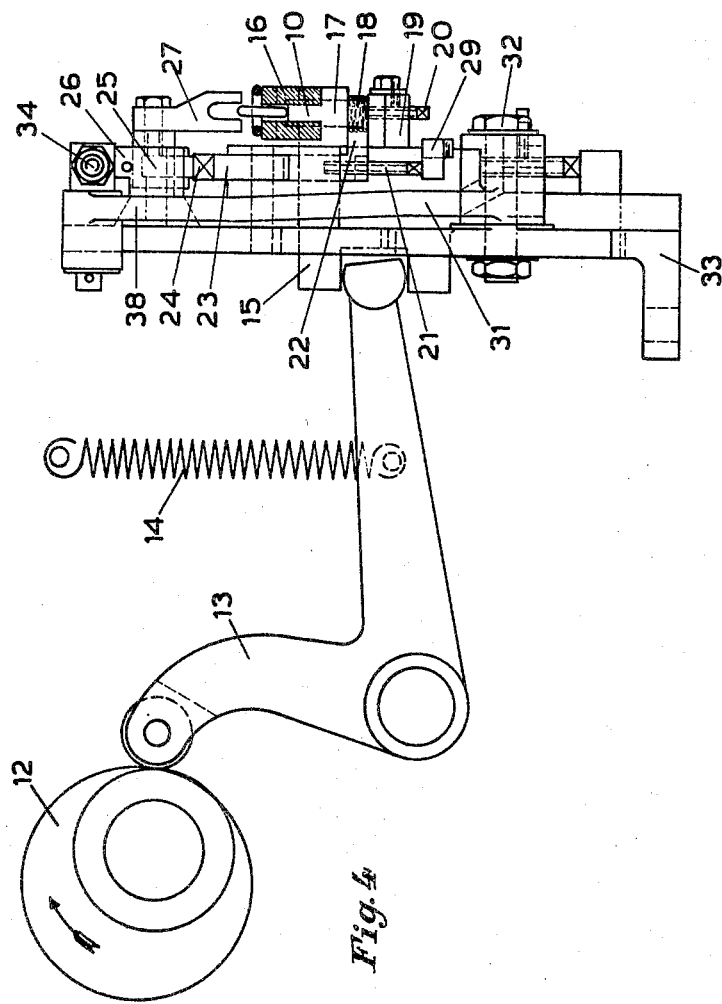

Sept. 14, 1954  W. WATTLER  2,688,838
PRESENTING CHAIN LINK FOR WELDING
Filed Dec. 15, 1950  3 Sheets-Sheet 1
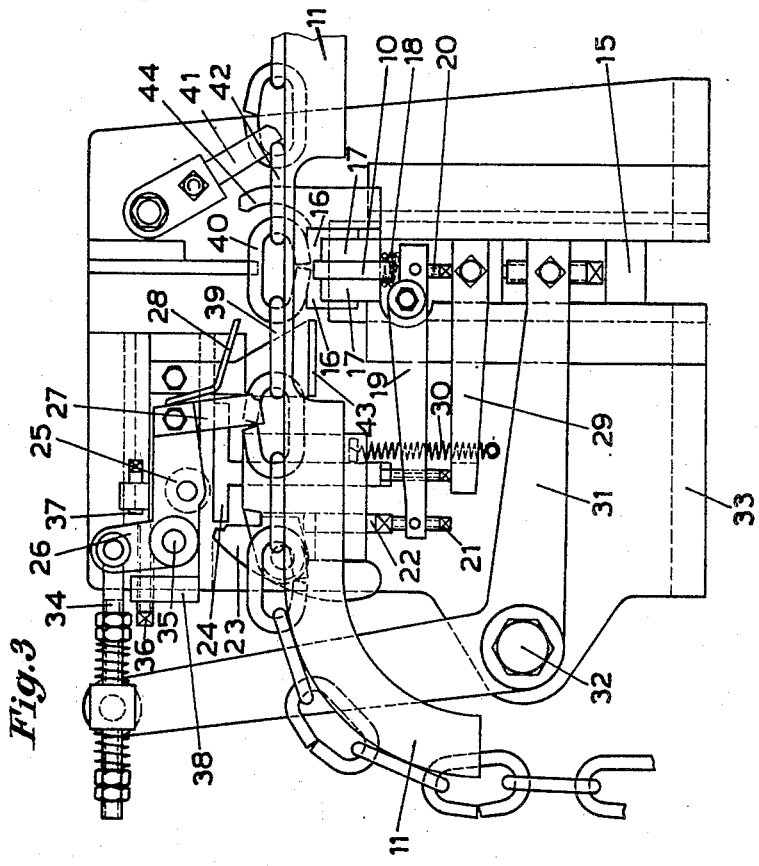
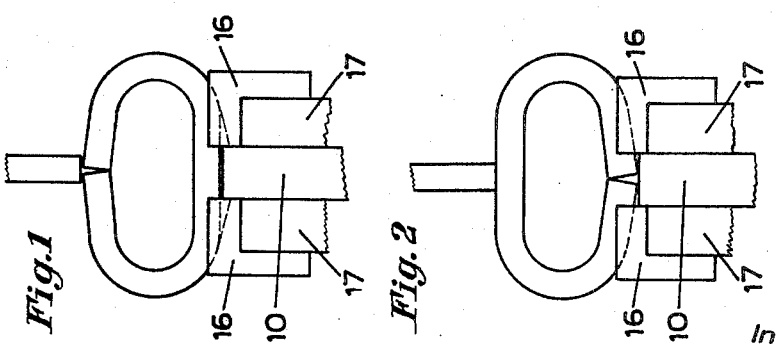
Inventor:
W. Wattler
by
Attorneys Sept. 14, 1954 W. WATTLER 2,688,838
PRESENTING CHAIN LINK FOR WELDING
Filed Dec. 15, 1950 3 Sheets-Sheet 2

Inventor:
W. Wattler
by
Hancock Downing & Wattler
Attorneys

Patented Sept. 14, 1954

2,688,838

UNITED STATES PATENT OFFICE 2,688,838

PRESENTING CHAIN LINK FOR WELDING

Wilhelm Wattler, Koln-Zollstock, Germany

Application December 15, 1950, Serial No. 200,981

Claims priority, application Germany December 19, 1949

6 Claims. (Cl. 59—34)

This invention relates to a method and an apparatus for automatically correctly presenting bent and interlaced chain links to be welded in an automatic chain welding machine, in the case of links the width of the clear opening in which is equal to at least twice the diameter of the wire of which they are made.

The links to be welded must always be presented to the electrodes of the welding machine in the same way, namely with the joint upwards. In automatic chain welding machines therefore the chain is always fed forward two link pitches at each revolution of the control shaft. With a clear width of opening of less than twice the wire diameter the relative position of every second link is always the same. In this case therefore the link always reaches the welding point between the electrodes correctly presented with the joint uppermost. With links having a clear width of opening more than twice the wire diameter it often happens however that a link is turned through 180° in its own plane. In order for it to be correctly presented to the electrodes it must therefore first be turned through 180° again. The incoming chain must therefore be continually watched, which requires time and labour and, especially with thin chains, affects the output of the machine.

Devices are already known in which the links in their passage into the welding machine are led over a feeling finger or blade. On the arrival of an incorrectly presented link with the joint below, this finger is intended to catch in the joint gap, be carried forward by the moving chain and by being moved laterally in this way in the direction of the feed of the chain to set in action a mechanism which turns the link through 180° and so correctly presents it for welding. This device has proved very delicate and ceases to be reliable after even a short period of use. Thus the feeling finger which must have a very fine edge, is not absolutely dependably carried forward by the joint gap. Through the continual sliding of the chain over the edge, the finger is subjected to heavy wear, it then no longer hooks in properly, slides out and does not set the link-turning mechanism in action. It can also occur that the finger moves through shocks during the movement of the chain and through roughness of the correctly presented links, or that a nick or the like in a correctly presented link carries the finger forward, so setting the link turning mechanism in action which then turns the correctly presented link into the wrong position. Further the mechanism for turning the wrongly presented links is very complicated in the known devices.

In order to overcome these deficiencies, that is to say to achieve greater reliability as well as a considerable simplification in the turning of the link, in accordance with the invention a basically different test method and a different mechanism for turning the links are employed.

The method according to the invention is no longer based on feeling the joint gap, for which a fine feeling member not sufficiently robust to stand up to practical operation cannot be avoided. The present invention on the contrary makes use of the fact that the free ends of the link which are to be butted at the joint are always at an obtuse angle to one another, that is to say, are not aligned with one another, whereas the other, continuous side of the link is straight. The method according to the invention consists therefore very simply in ascertaining whether the long side of the link presented towards the electrodes is straight or of what for convenience may be termed divergent form. This determination can be carried out and made use of in various ways, as for example optically or electrically. According to a further development however a mechanical testing method, making use of a three point bearing, is used.

An example is illustrated in the accompanying drawings in which

Figure 5:
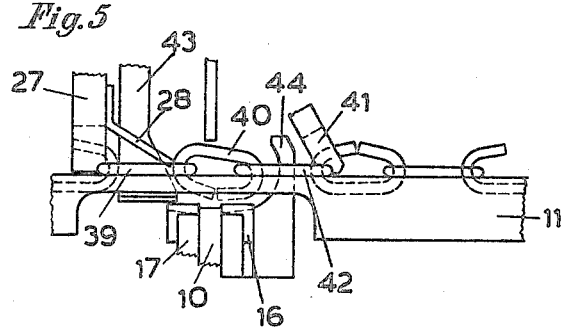
Figure 6:
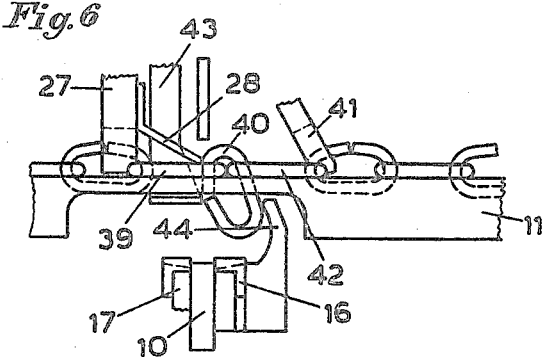
Figure 7:
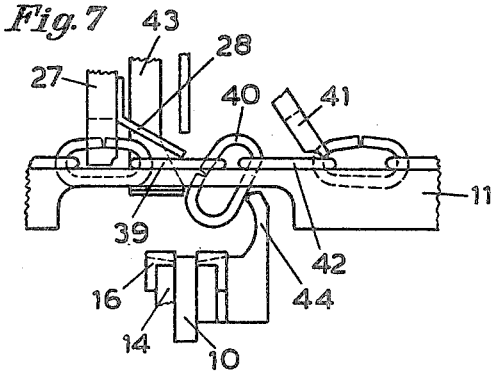

Figure 1 is a view of an unwelded chain link of a width at least four times the wire diameter, i. e. having a clear opening width at least twice the wire diameter, on the diagrammatically illustrated testing device, the link being correctly presented in this figure, Figure 2 is a similar view but with the link incorrectly presented, Figure 3 is a front view of the link turning mechanism according to the invention, Figure 4 is a side view of the mechanism of Figure 3 with the means for operating it from the control shaft of the welding machine, Figures 5, 6 and 7 are details showing different positions during the turning of an incorrectly presented link.

The mechanism shown in Figures 3 and 4 is so set by adjustment along a guide not shown screwed or otherwise secured to the frame of the chain welding machine also not shown, that between the feed steps of the chain in the machine, one link stands upright centrally over a push-rod 10 of the mechanism as shown in Figure 3. This possibility of lateral adjustment is necessary if the machine is to deal with links of different lengths.

If now a link is incorrectly presented, that is with the joint gap or divergent side downwards in relation to a guide rail 11 of the mechanism, as shown in Figure 2, it must be turned through 180°. The parts described below serve to do this, which are moved by the action of a cam disc or eccentric 12 and spring 14 shown in Figure 4, which cam disc is driven at the same time as the chain feed conveyor by the control shaft of the chain welding machine.

The cam disc 12, against which an angle lever 13 is forcibly held by the spring 14, through the lever 13 causes a slide 15 to be lifted at the beginning of the test cycle (Figures 3 and 4). In the upper end of this slide, the above mentioned push rod 10 is slidably mounted between two angle pieces 16, which serve as supports or abutments to contact with the underside of the chain link. The angle pieces 16 are shaped to receive an incorrectly presented link as well as a correctly presented link and are supported on an upper slide part 17 movable in relation to the rest of the slide, which part 17 is held pressed upwards by a short compression spring 18, the push rod 10 being so adjusted in relation to the angle pieces 16 that when a link is correctly presented the push rod will not be checked by the straight underside of the link; preferably as shown the adjustment is such that the upper surface of the push rod 10 just does not touch the straight underside of the link (Figure 1). On the other hand the divergent form of an incorrectly presented link will hold back the push rod 10 (Figure 2). This pressing back of the push rod 10 in relation to the upper slide 17 held in its upward position by the spring 18 is transmitted to a two-armed lever 19 fulcrumed on this upper part 17 of the slide, the height of the push-rod 10 being adjusted by an adjusting screw 20 carried by the lever. When a link is correctly presented a pawl 23 holds up a track 24 and thereby through a roller 25 also holds up an angle-lever 26 carrying feed members 27 and 28, but when the lever 19 is moved by the pressing back of the push rod 10 when a link is incorrectly presented, the longer arm of the lever 19 through an adjusting screw 21 and for example a push rod 22, moves the pawl 23 counterclockwise so that it disengages the track 24, this position being shown in Figure 3.

There are numerous alternative possibilities. For example the pressed back push-rod 10 might directly or through a lever actuate an electric switch by which the movements for rotating the link are set in action by retraction of means locking the push rod 22.

Another possibility is for the links lying flat on the guide rail 11 with the incorrectly presented link between them hanging down through the rail to be pushed further forward until the lower end of the suspended link meets a stop, over which during the movement of the chain through the welding machine this link is turned further.

Yet another possibility is for the links to be pushed forward by a corresponding movement of the mechanism at each revolution of the welding machine, a correctly presented link being pushed over a support which prevents it from tipping, while an incorrectly presented link through the operation the push rod 10 causes the support to be moved out of the way so that the link can tip and during the forward movement of the chain through the welding machine by meeting a stop is turned into the correct position as above described.

In the illustrated mechanism, through further rotation of the central shaft and cam disc 12 the lever 13 is now swung back and the slide 15 descends. At the same time an arm 29 fast to the slide 15 also descends and permits the track 24 which is drawn downwards by a spring 30 to follow immediately. The pawl 23 which has been held back by the push rod 22 acted upon by the lever 19 cannot now act to check the track 24 because the lever 19 which with the push rod 10 and the angle pieces 16 is supported on the upper slide part 17 and held against the chain link by the spring 18 only releases the pawl 23 when the slide 15 with the arm 29 has descended at least 3 to 4 mm., so that the track 24 and angle lever 26 both continue to descend following the arm 29. This brings the feed members 27 and 28 down to the level of the chain links (Figure 5). The slide 15 also pushes down one arm of a lever 31 which is fulcrumed at 32 on a base plate 33. The other arm of this lever through a spring push rod 34 moves the angle lever 26 which has its fulcrum 35 as well as check abutments 36 and 37 on a horizontally sliding member 38, together with the feed members 27 and 28 at the front end of the lever 26 behind the chain links 39 and 40 lying on the guide rail 11; this movement of the members 27, 28 respectively moves these links forward until link 39 is against a link 42 held by a spring stop 41, while the link 40 now having its centre of gravity beyond the near end of link 42 tips forwardly and turns through about 90° (Figure 6). This turning movement is assisted by an abutment 43 secured to the sliding member 38, which during the forward movement of the member 38 supports the link 40 to be turned towards its rear end and prevents turning thereof in the wrong direction. At the same time by means of a hook 44 secured to the slide 15, the forwardly moved link 40 is drawn downwards and so positively caused to tip.

During the following movement of the chain through the welding machine by two link pitches, the lower end of the downwardly suspended link 40 catches the hook 44 (Figure 7) and is thus positively turned through a further 90° into the desired position.

After completion of the chain feed step the lever 13, following the cam disc 12 again lifts the slide 15. The push rod 10 is now beneath the next upright link. If this is correctly presented, no relative depression of the push rod 10 can occur because the straight side of the link is resting on the angle pieces 16 and the push rod does not even touch the link (Figure 1). The lifting of the slide 15 by the return of the lever 31 has also lifted the track 24 and the pawl 23 has engaged it and holds it raised when the slide 15 next descends and the forward swing of the lever 31 takes place. The angle lever 26 which is supported by the roller 25 on the track 24 held in its raised position, moves to and fro with its feed member 27 and 28 moving above and clear of the chain links.

The cycle of movement of the slide 15, the lever 31 and the angle lever 26, as well as the feed of the chain, takes place at each revolution of the control shaft of the welding machine, whereas the extra movement of the links 39 and 40 to turn the link 40 lying over the push rod 10 can only take place when through incorrect presentation of the link the push rod 10 is pressed back and so disengages the pawl 23 from the track 24.

I claim:

1. Means for detecting during their passage into an automatic chain welding machine of the direction of presentation of interlaced chain links having a clear width of opening equal to at least twice the diameter of the wire of which they are made, each link having one straight side and a side comprising two diverging parts, which includes means reciprocated substantially in the plane of the link towards and away from one of said sides of the link in a direction substantially perpendicular to the long axis of the link, two surfaces on said reciprocated means placed to make contact with the said side of the link at its ends, a rod slidable on said reciprocated means between said surfaces in the same direction as the direction of reciprocation, to make contact with the middle means of said side, urging said slidable rod towards the chain link, and means for detecting the movement of said slidable rod relative to said reciprocated means when said slidable rod contacts the side having the two diverging parts of a link before said surfaces make contact with such long side.

2. The combination with means as set forth in claim 1 of automatic means for turning a link through 180° in its own plane, and means for setting such turning means into operation when said detecting means detects a movement of said slidable means relative to said reciprocated means.

3. Mechanism for automatically correctly presenting the links of a chain to the electrodes of an automatic chain welding machine comprising a base, means thereon for guiding the chain with alternate links upright, means for feeding the chain along said guiding means in steps of two link pitches, a slide vertically slidable in said base beneath said guiding means in a position at which a link stands upright between the feed steps, means for reciprocating said slide once per feed cycle between the feed steps, two surfaces on said slide located to make contact with the underside of the said link at longitudinally spaced points thereon, a push rod vertically slidable on said slide between said surfaces, means yieldably urging said push rod forward to a position in which if the underside of said link is continuous the upper end of said push rod will not contact said links when said surfaces contact said underside while if said underside has two divergent parts said push rod will be pushed back relative to said surfaces when said surfaces contact such underside, an actuating lever carried by said slide and actuated by such relative movement of said push rod, and means set in action by the movement of said lever to cause said link to be turned through 180° in its own plane.

4. Mechanism as set forth in claim 3 wherein said link turning means comprises a spring stop for the chain link in front of that link which is located over said slide, a first angle lever fulcrummed on said base and actuated by said slide, a member horizontally slidable on said base, a second angle lever fulcrummed on said member, to feed members on said second angle lever, yielding means interconnecting said first and second angle levers, a vertically displaceable horizontal track on said base coacting with said second angle lever to determine the level of said feed members, means normally locking said track at a level at which said feed members are clear of the chain, means actuated by said actuating lever for releasing said locking means when said push rod is pressed back by two divergent parts of the link, means urging said track downward whereby when it is released said feed members are lowered to engage the chain on the forward movement of said slidable member said feed members being located so that one pushes forward the link behind the tested link and the other commences to turn the tested link, a stop located beneath the chain beyond the test point whereby the turning of the partly turned link is completed when the chain is fed forward, and means on said slide for lifting said track at the beginning of the next cycle if it has been lowered by the operation of the actuating lever.

5. Mechanism as set forth in claim 4 wherein said second stop is carried by said slide and is of such form as to engage the forward end of the tested link if it is fed forward by the second of said feed members and so positively assist in giving it the first part of its turning movement.

6. Mechanism as set forth in claim 4 also comprising an abutment on said horizontally sliding member which engages the underside of the tested link towards its rear end when the said horizontally slidable member is moved to its extreme forward position.

References Cited in the file of this patent

UNITED STATES PATENTS

| Number | Name | Date |
|---|---|---|
| 1,652,390 | Boutin | Dec. 13, 1927 |
| 2,344,435 | Winter et al. | Mar. 14, 1944 |
| 2,414,970 | Morelle | Jan. 28, 1947 |

FOREIGN PATENTS

| Number | Country | Date |
|---|---|---|
| 894,407 | France | Mar. 13, 1944 |